United States Patent
Nakai

(10) Patent No.: US 10,228,769 B2
(45) Date of Patent: Mar. 12, 2019

(54) EQUIPMENT CONTROL DEVICE, EQUIPMENT CONTROL METHOD, AND NON-TRANSITORY RECORDING MEDIUM

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 61 days.

(21) Appl. No.: 15/226,777

(22) Filed: Aug. 2, 2016

(65) Prior Publication Data

US 2017/0090587 A1    Mar. 30, 2017

(30) Foreign Application Priority Data

Sep. 24, 2015 (JP) .................. 2015-187104

(51) Int. Cl.
*G06F 3/01* (2006.01)
*B60W 50/10* (2012.01)
*B60Q 3/80* (2017.01)

(52) U.S. Cl.
CPC .............. *G06F 3/017* (2013.01); *B60Q 3/80* (2017.02); *B60W 50/10* (2013.01); *G06F 3/011* (2013.01); *G06F 3/013* (2013.01); *B60K 2350/1052* (2013.01); *B60W 2540/00* (2013.01)

(58) Field of Classification Search
CPC .................. G06F 3/017; G06K 9/00
See application file for complete search history.

(56) References Cited

U.S. PATENT DOCUMENTS

| 7,893,920 B2 * | 2/2011 | Endoh ............... G06F 3/011 345/156 |
| 8,823,642 B2 * | 9/2014 | Valik ............... G06F 3/017 345/156 |
| 8,836,642 B2 * | 9/2014 | Mori ............... G06F 3/04815 345/157 |
| 9,560,272 B2 * | 1/2017 | Lee ............... H04N 5/23229 |

(Continued)

FOREIGN PATENT DOCUMENTS

JP    2014-119295    6/2014
WO   2013/190538 A1  12/2013

(Continued)

OTHER PUBLICATIONS

The Extended European Search Report dated Jan. 20, 2017 for the related European Patent Application No. 16183191.2.

*Primary Examiner* — Alex C Dunn
(74) *Attorney, Agent, or Firm* — Greenblum & Bernstein, P.L.C.

(57) ABSTRACT

An equipment control device includes a receiver that receives sensing result information including a position, a shape, and a movement of a predetermined object and including a position of an eye point of a person, and a controller that, when the sensing result information indicates that the eye point, equipment placed at a predetermined position, and the object align and that the object is in a predetermined shape corresponding to the equipment in advance, determines command information causing to operate the equipment in accordance with the movement of the object in the predetermined shape to an equipment operating device.

5 Claims, 5 Drawing Sheets

(56) References Cited

U.S. PATENT DOCUMENTS

| | | | |
|---|---|---|---|
| 2013/0028489 A1* | 1/2013 | Tracton | G06K 9/228 382/128 |
| 2013/0163877 A1* | 6/2013 | Morishita | G06K 9/00268 382/190 |
| 2014/0168061 A1* | 6/2014 | Kim | G06F 3/017 345/156 |
| 2014/0172231 A1 | 6/2014 | Terada et al. | |
| 2015/0199019 A1* | 7/2015 | Steers | G06F 3/017 348/148 |
| 2015/0234469 A1* | 8/2015 | Akiyoshi | G06F 3/011 345/156 |
| 2017/0083777 A1* | 3/2017 | Arata | G06K 9/00838 |
| 2017/0186428 A1* | 6/2017 | Kunitake | G10L 15/22 |

FOREIGN PATENT DOCUMENTS

| | | |
|---|---|---|
| WO | 2015/001547 A1 | 1/2015 |
| WO | 2015/062751 A1 | 5/2015 |

* cited by examiner

| EQUIPMENT | SHAPE OF HAND | MOVEMENT OF HAND | MOVEMENT OF EQUIPMENT |
|---|---|---|---|
| DOOR MIRROR | SHAPE IN WHICH UPPER AND LOWER PORTIONS OF DOOR MIRROR ARE SANDWICHED | x° ROTATION IN DIRECTION a | x° ROTATION IN DIRECTION a |
| | | x° ROTATION IN DIRECTION b | x° ROTATION IN DIRECTION b |
| | | x° ROTATION IN DIRECTION c | x° ROTATION IN DIRECTION c |
| | | x° ROTATION IN DIRECTION d | x° ROTATION IN DIRECTION d |

11 12 13 14

EQUIPMENT CONTROL DEVICE, EQUIPMENT CONTROL METHOD, AND NON-TRANSITORY RECORDING MEDIUM

BACKGROUND

1. Technical Field

The present disclosure relates to an equipment control device, an equipment control method, and a non-transitory recording medium.

2. Description of the Related Art

Techniques that enable users to remotely operate predetermined equipment have been known in recent years.

For example, Japanese Unexamined Patent Application Publication No. 2014-119295 discloses a device that detects orientation of a user's hand from a picked-up image and outputs a control command based on the orientation of the hand to equipment. It is described that this device may control the equipment through simple operations.

The device according to Japanese Unexamined Patent Application Publication No. 2014-119295, however, has an issue that controlling equipment only based on the orientation of a hand involves a high possibility of causing the equipment to malfunction.

SUMMARY

One non-limiting and exemplary embodiment provides an equipment control device, an equipment control method, an equipment control program, and a recording medium, which can reduce malfunctions of equipment.

In one general aspect, the techniques disclosed here feature an equipment control device that includes a receiver that receives sensing result information including a position, a shape, and a movement of a predetermined object and including a position of an eye point of a person, and a controller that, when the sensing result information indicates that the eye point, equipment placed at a predetermined position, and the object align and that the object is in a predetermined shape corresponding to the equipment in advance, determines command information causing to operate the equipment in accordance with the movement of the object in the predetermined shape to an equipment operating device.

According to the present disclosure, malfunctions of equipment can be reduced.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of a table according to the embodiment of the present disclosure;

DETAILED DESCRIPTION

An embodiment of the present disclosure is described in detail below with reference to the drawings.

Figure 1:
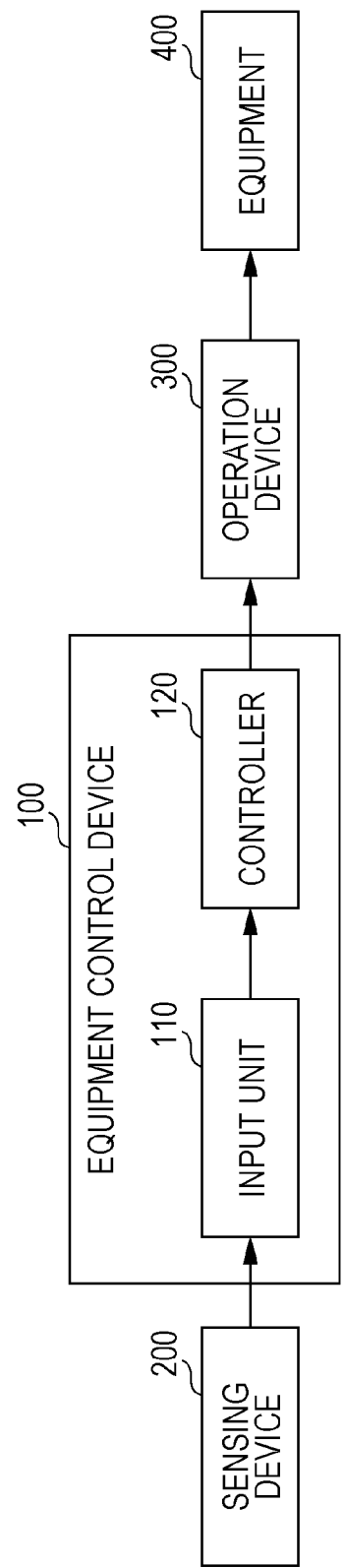
FIG. 1 is a block diagram that illustrates an example of a configuration of an equipment control system including an equipment control device according to an embodiment of the present disclosure.

An example of a configuration of an equipment control system, which includes an equipment control device 100 according to the embodiment of the present disclosure, is described first with reference to FIG. 1. FIG. 1 is a block diagram that illustrates the example of the configuration of the equipment control system including the equipment control device 100 according to the embodiment of the present disclosure.

As illustrated in FIG. 1, the equipment control system includes the equipment control device 100, a sensing device 200, an operation device 300, and equipment 400. The equipment control device 100, the sensing device 200, the operation device 300, and the equipment 400 are mounted in a mobile unit, such as an automobile, a rail car, a ship, or an aircraft. The present embodiment is described while taking a case where each device illustrated in FIG. 1 is mounted in an automobile, which may be hereinafter referred to as a vehicle, as an example.

Each of the sensing device 200, the operation device 300, and the equipment 400 is described below.

The sensing device 200 is a camera or radar for example. Examples of the camera include a driver monitoring camera, a visible light camera, an infrared camera, a distance-measuring camera, a stereo camera, and a time-of-flight (TOF) camera.

The sensing device 200 senses the position of an eye point of the vehicle's occupant, who is an example of a user, and outputs eye-point position information indicating the sensed position, which is an example of sensing result information, to the equipment control device 100.

Further, the sensing device 200 senses the position of a predetermined body part of the occupant, which is an example of an object, and outputs object position information indicating the sensed position, which is an example of the sensing result information, to the equipment control device 100. The present embodiment is described while taking a case where the predetermined body part is a hand as an example.

Further, the sensing device 200 senses the shape of the hand of the occupant and outputs shape information indicating the sensed shape, which is an example of the sensing result information, to the equipment control device 100.

Further, the sensing device 200 senses a movement of the hand of the occupant and outputs movement information indicating the sensed movement, which is an example of the sensing result information, to the equipment control device 100.

Since each of the above-described sensing techniques of the sensing device 200 is known, detailed descriptions thereof are omitted.

Although in the description above, an example in which the sensing device 200 senses the position of the eye point, the position of the hand, the shape of the hand, and the movement of the hand is taken, a plurality of sensing devices 200 may be used to sense the position of the eye point, the shape of the hand, and the movement of the hand. For example, a driver monitoring camera may sense the position of the eye point and a TOF camera may sense the position of the hand, the shape of the hand, and the movement of the hand.

The operation device 300 operates the equipment 400. On receiving command information from the equipment control device 100, the operation device 300 operates the equipment 400 in accordance with the command information. The command information is described in detail below.

The equipment 400 is operated by the operation device 300 and is for example, a door, a door mirror (a side-view mirror), a rear-view mirror (a room mirror), a door window, a roof window, a car navigation device, an audio device, an air conditioner, a rear camera, a side camera, a front camera, an electronic toll collection (ETC) in-vehicle device, a trunk lid, a tail gate, a headlight, or a wiper.

Each of the sensing device 200, the operation device 300, and the equipment 400 is described above. Next, a configuration of the equipment control device 100 is described.

As illustrated in FIG. 1, the equipment control device 100 is coupled to the sensing device 200 and the operation device 300 and includes an input unit 110 and a controller 120.

The input unit (receiver) 110 receives the eye-point position information, the object position information, the shape information, and the movement information from the sensing device 200 and outputs the received information to the controller 120.

On receiving the eye-point position information, the object position information, the shape information, and the movement information from the input unit 110, the controller 120 reads predetermined equipment position information and shape information from a predetermined storage device, which is not illustrated. The equipment position information indicates the placement position of the equipment that is a predetermined object to be operated. In the description below, a case where the equipment 400 as the object to be operated is a door mirror is taken as an example.

After that, in accordance with the eye-point position information, the object position information, and the equipment position information, the controller 120 determines whether or not the eye point, the hand, and the door mirror align.

Figure 2:
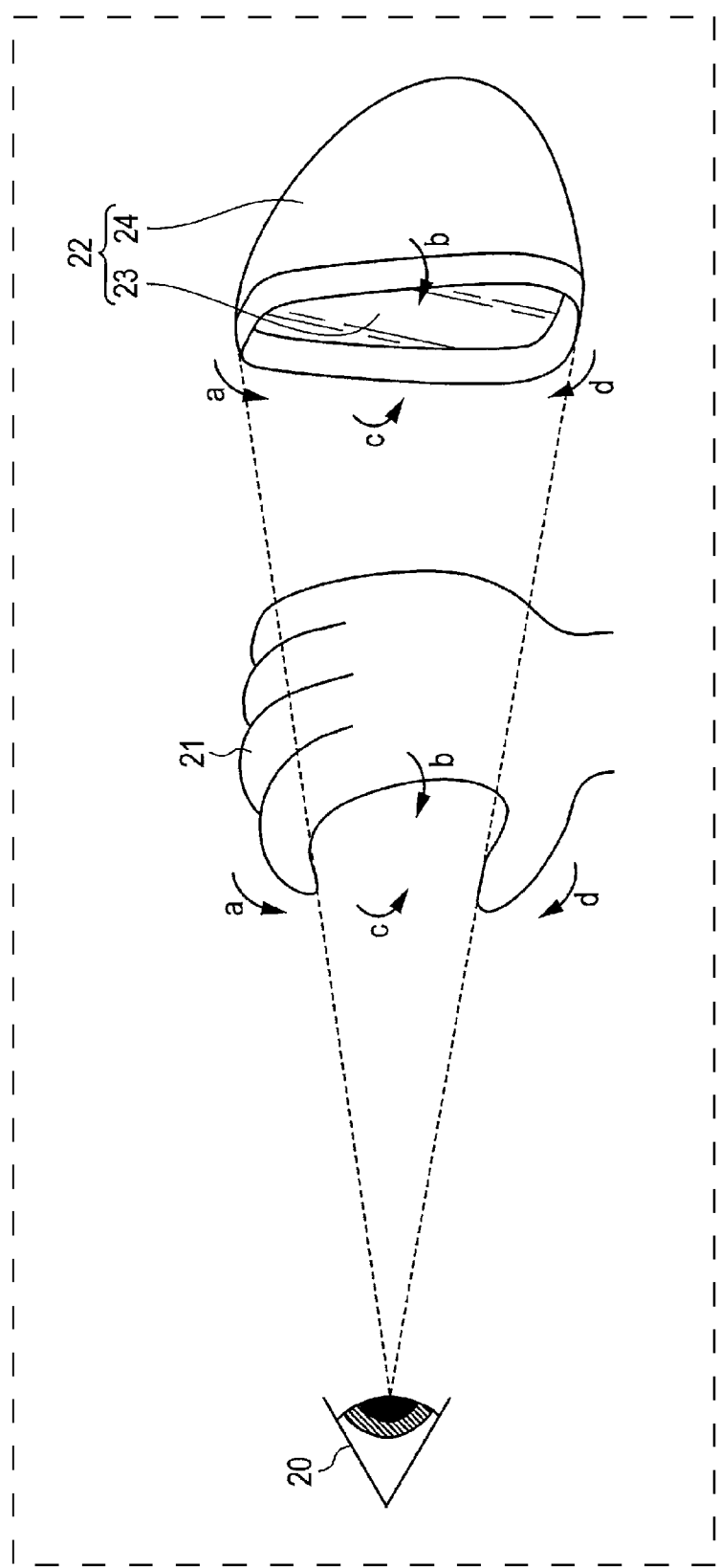
FIG. 2 illustrates an example of a state in which an eye point, a hand, and a door mirror align according to the embodiment of the present disclosure.

When for example, as illustrated in FIG. 2, the occupant wants to operate a door mirror 22, the occupant causes a hand 21 to be in a predetermined shape and moves the hand 21 to a position between an eye point 20 and the door mirror 22. Accordingly, the eye point 20, the hand 21, and the door mirror 22 align as illustrated in FIG. 2. In such a state, the controller 120 determines that the eye point, the hand, and the door mirror align.

As illustrated in FIG. 2, the door mirror 22 includes a mirror 23 and a cover 24. The mirror 23 is rotatable in directions of arrows a to d illustrated in FIG. 2.

When it is determined that the eye point, the hand, and the door mirror align, the controller 120 determines whether or not the shape of the hand indicated by the shape information received from the sensing device 200 is a predetermined shape. The predetermined shape is for example, a shape in which upper and lower portions of the door mirror 22 are sandwiched in a hand.

For example, as illustrated in FIG. 2, the occupant is making the shape in which the upper and lower portions of the door mirror 22 are sandwiched between the forefinger and the thumb of the hand 21, the controller 120 determines that the shape of the hand indicated by the shape information is the predetermined shape.

When the shape of the hand is the shape in which the upper and lower portions of the door mirror 22 are sandwiched, the controller 120 reads a table corresponding to the door mirror and the predetermined shape of the hand from the predetermined storage device, not illustrated.

An example of the table is described below with reference to FIG. 3. FIG. 3 illustrates an example of a table 10.

As illustrated in FIG. 3, the table 10 includes information 11, information 12, information 13, and information 14.

The information 11 indicates the equipment 400 as the object to be operated. In FIG. 3, the information 11 denotes that the equipment 400 as the object to be operated is a door mirror for example.

The information 12 indicates the shape of a hand of an occupant. In FIG. 3, the information 12 denotes that the shape of the hand is the shape in which upper and lower portions of the door mirror are sandwiched for example.

The information 13 indicates a movement of the hand of the occupant. In FIG. 3, the information 13 denotes that the movement of the hand is a movement of rotation in a predetermined direction, which is a direction of a, b, c, or d in FIG. 2, by a predetermined angle, which is x° for example.

The information 14 indicates a movement of the equipment 400. In FIG. 3, the information 14 denotes that the movement of the equipment 400 is a movement of rotation in a predetermined direction, which is a direction of a, b, c, or d in FIG. 2, by a predetermined angle, which is x° for example.

Hereinafter, the direction indicated by arrow a in FIG. 2 is referred to as "direction a", the direction indicated by arrow b in FIG. 2 is referred to as "direction b", the direction indicated by arrow c in FIG. 2 is referred to as "direction c", and the direction indicated by arrow d in FIG. 2 is referred to as "direction d".

An example of the table is described above. The controller 120 is further described below.

Subsequently, the controller 120 performs a process described below in accordance with the read table and each information received from the input unit 110.

The controller 120 determines whether or not the movement of the hand indicated by the movement information is a predetermined movement, such as the movement of rotation in a predetermined direction in a predetermined angle, which is indicated by the information 13 in the table 10.

An example of the movement of the hand is described below with reference to FIG. 2.

When the occupant wants to operate the door mirror 22 (e.g. wants to adjust the angle of the mirror 23) as illustrated in FIG. 2, the occupant moves the hand 21 in the shape in which the upper and lower portions of the door mirror 22 are sandwiched to a position between the eye point 20 and the door mirror 22 and after that, while maintaining the shape, rotates the hand 21 in one of directions a to d. For example, when the occupant wants to orient the door mirror 22 downward, the occupant rotates the hand 21 in direction a by a desired angle)(x°) while maintaining the shape in which the upper and lower portions of the door mirror 22 are sandwiched.

When the controller 120 determines that the movement of the hand is the movement of x° rotation in one of directions a to d, the controller 120 generates the command information based on the information 14 indicating the movement of the equipment, which is caused to correspond to the information 13 indicating the movement of the hand in the table 10, and outputs the command information to the operation device 300. The command information is control information for the operation device 300 to operate the equipment 400. When for example, the controller 120 determines that the movement of the hand is the movement of x° rotation in direction a, the controller 120 generates the command information for rotating the mirror 23 in direction a by x°.

The operation device 300 operates the equipment 400 in accordance with the command information received from the controller 120. When for example, the operation device 300 receives the command information for rotating the mirror 23 in direction a by x°, the operation device 300 rotates the mirror 23 in direction a by x°.

A configuration of the equipment control device 100 is described above.

Figure 4:
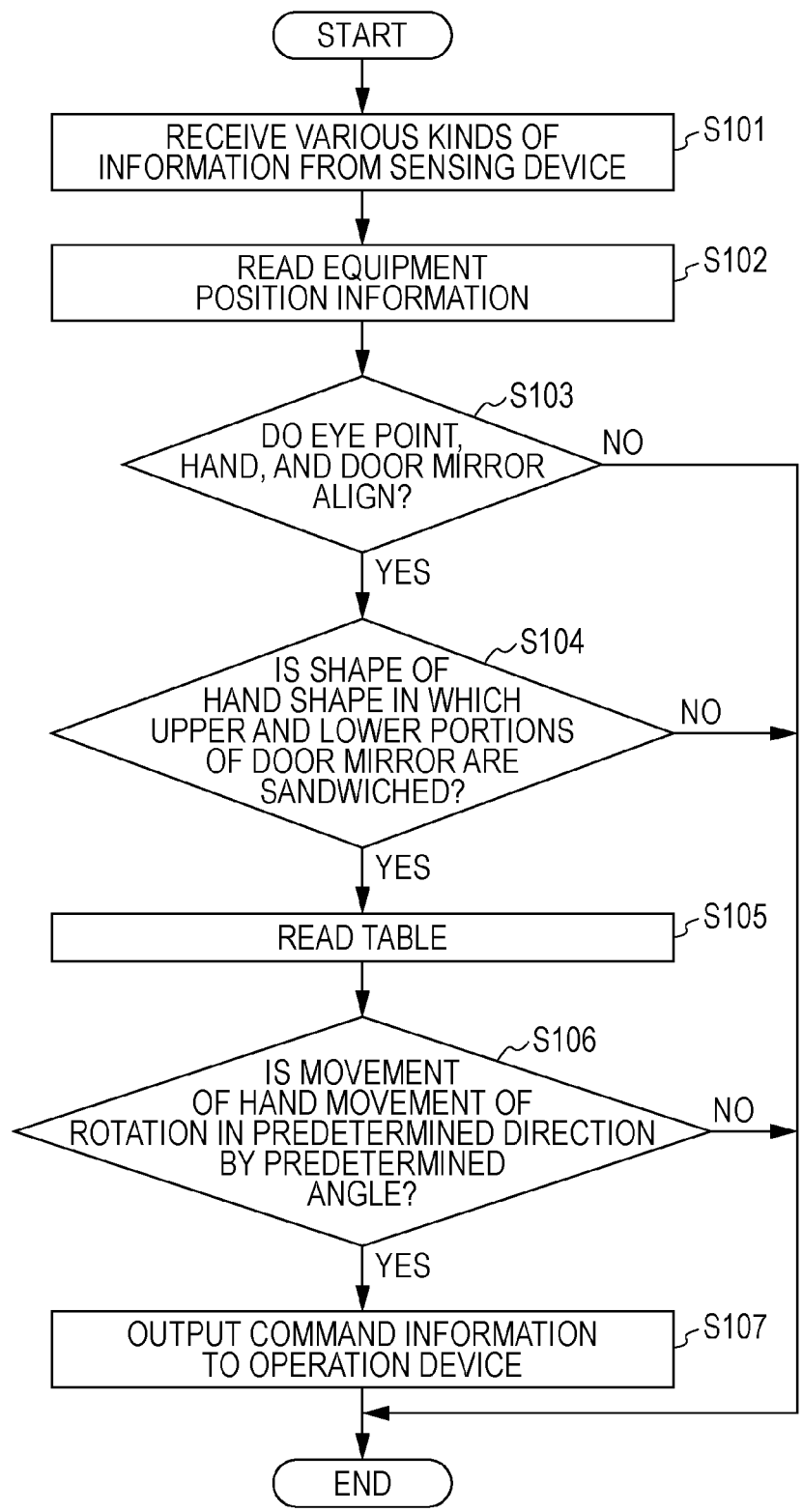
FIG. 4 is a flow chart that illustrates an example of a procedure of operations of the equipment control device according to the embodiment of the present disclosure.

An example of operation of the equipment control device 100 according to the embodiment of the present disclosure is described with reference to FIG. 4. FIG. 4 is a flow chart that illustrates an example of a procedure of operations of the equipment control device 100 according to the embodiment of the present disclosure. The procedure illustrated in FIG. 4 is performed at predetermined intervals after activation of a system of the equipment control device 100 until the end of the system of the equipment control device 100. The predetermined intervals may be, for example, intervals at which images are obtained.

The input unit 110 receives the eye-point position information, the object position information, the shape information, and the movement information from the sensing device 200 (step S101). After that, the input unit 110 outputs the received information to the controller 120. For example, the eye-point position information indicates the position of the eye point 20 illustrated in FIG. 2, and the object position information indicates the position of the hand 21 illustrated in FIG. 2. For example, the shape information indicates the shape of the hand 21 illustrated in FIG. 2 and the movement information indicates the movement of the hand 21 illustrated in FIG. 2, which rotates in one of directions a to d by x°.

On receiving the eye-point position information, the object position information, the shape information, and the movement information from the input unit 110, the controller 120 reads the equipment position information from the predetermined storage device (step S102). For example, the equipment position information indicates the placement position of the door mirror 22.

After that, the controller 120 determines whether or not the eye point, the hand, and the door mirror align in accordance with the eye-point position information, the object position information, and the equipment position information (step S103).

When it is determined in step S103 that the eye point, the hand, and the door mirror do not align (NO in step S103), the process ends.

When it is determined in step S103 that the eye point, the hand, and the door mirror align (YES in step S103), the controller 120 determines whether or not the shape of the hand indicated by the shape information received from the sensing device 200 is the shape in which the upper and lower portions of the door mirror 22 are sandwiched in a hand (see FIG. 2) (step S104).

When it is determined in step S104 that the shape of the hand indicated by the shape information is not the shape in which the upper and lower portions of the door mirror 22 are sandwiched in a hand (NO in step S104), the process ends.

When it is determined in step S104 that the shape of the hand indicated by the shape information is the shape in which the upper and lower portions of the door mirror 22 are sandwiched in a hand (YES in step S104), the controller 120 reads a table that corresponds to the door mirror and the shape of the hand from the predetermined storage device (step S105). For example, the table is the table 10 illustrated in FIG. 3.

Subsequently, the controller 120 determines whether or not the movement of the hand indicated by the movement information is the movement of rotation in a predetermined direction by a predetermined angle, which is indicated by the information 13 in the table 10 (step S106). For example, the predetermined direction is one of directions a to d illustrated in FIG. 2.

When it is determined in step S106 that the movement of the hand is not the movement of rotation in a predetermined direction by a predetermined angle (NO in step S106), the process ends.

When it is determined in step S106 that the movement of the hand is the movement of rotation in a predetermined direction by a predetermined angle (YES in step S106), the controller 120 generates the command information for causing the door mirror to perform the movement that is set so as to correspond to the movement of the hand, that is, the movement of the equipment indicated by the information 14 in the table 10 and outputs the command information to the operation device 300 (step S107). When for example, the movement of the hand is the movement of x° rotation in direction a, the command information serves as the information for rotating the mirror 23 in direction a by x°.

The operation device 300 operates the mirror 23 of the door mirror 22 in accordance with the command information received from the controller 120. When for example, the operation device 300 receives the command information for rotating the mirror 23 in direction a by x°, the operation device 300 rotates the mirror 23 in direction a by x°.

As described above, when the eye point of a user, a hand of the user, and equipment placed at a predetermined position align and the hand is in a predetermined shape, the equipment control device 100 according to the present embodiment outputs the command information for operating the equipment in accordance with the movement of the hand to the device that operates the equipment. Thus, even when an occupant with no intention to operate the equipment causes his or her hand to be in a predetermined shape, the equipment can be prevented from being operated and malfunctions of the equipment can be reduced accordingly.

Further, according to the equipment control device 100 of the present embodiment, the occupant is only desired to cause his or her hand to be in a shape similar to the shape made in actually operating the equipment and thus, the occupant need not remember a predetermined shape.

In addition, according to the equipment control device 100 of the present embodiment, the occupant is only desired to cause his or her hand to perform a movement similar to the movement performed in actually operating the equipment and thus, operations based on intuition are possible as well as subtle adjustments.

Although the embodiment of the present disclosure is described above, the present disclosure is not limited to the description of the embodiment. Variations are described below.

<Variation 1>

Although in the embodiment, the controller 120 determines whether or not the eye point, the hand, and the equipment align, the present disclosure is not limited thereto. For example, the controller 120 may calculate the direction of a line of sight based on the position of the eye point indicated by the eye-point position information and may determine whether or not the hand and the equipment substantially align in the direction of the line of sight. Accordingly, the command information is output while the occupant directs the line of his or her sight toward the equipment and malfunctions can be further reduced. This is also effective when the equipment needs to be seen while being operated. The direction of the line of sight may be calculated by a device other than the controller 120, which is the sensing device 200 for example.

<Variation 2>

Although for example, the embodiment describes a case where pieces of the information 13 each indicating the movement of the hand and corresponding pieces of the information 14 each indicating the movement of the equipment are identical in content in the table 10 illustrated in FIG. 3, the present disclosure is not limited thereto. For example, the movement of the hand indicated by a piece of the information 13 and the movement of the equipment and indicated by a piece of the information 14 corresponding to the piece of the information 13 may be different from each other.

For example, the movement of the hand indicated by the information 13 may be an "x-cm movement in a downward direction" and the movement of the equipment corresponding to the information 13 and indicated by the information 14 may be "x° rotation in direction a".

As another possibility, for example, the movement of the hand indicated by the information 13 may be "x° rotation in direction a" and the movement of the equipment corresponding to the information 13 and indicated by the information 14 may be "y° rotation (y≠x) in direction a".

<Variation 3>

Although for example, the embodiment describes a case where the equipment 400 as the object to be operated is a door mirror, the present disclosure is not limited thereto.

When for example, the equipment 400 is a door window or a roof window, the predetermined shape of the hand may be a shape made in opening the window, such as the shape in which tips of bent fingers are hung on the window, and the predetermined movement of the hand and the movement of the equipment may each be a traveling movement in a predetermined direction by a predetermined distance.

When for example, the equipment 400 is a door, the predetermined shape of the hand may be a shape made in opening the door, such as the shape in which tips of bent fingers are hung on the door lever or the shape in which a tip of a bent finger pushes a door switch down, and the predetermined movement of the hand may be a traveling movement in a predetermined direction while the predetermined movement of the equipment may be an opening operation or a closing operation.

<Variation 4>

Although the embodiment describes a case where the number of pieces of the equipment to be operated is one as an example, the number of pieces of the equipment to be operated may be two or more. In this case, the equipment position information and the table corresponding to each piece of the equipment are held in a predetermined storage device, and the controller 120 reads the plurality of pieces of the equipment position information from the predetermined storage device in step S102 illustrated in FIG. 4. After that, in step S103 illustrated in FIG. 4, the controller 120 determines whether or not the positions of the pieces of the equipment indicated by the plurality of pieces of the equipment position information, which have been read, include a position that causes a state in which a piece of the equipment aligns with the eye point and the hand. When, as a result of the determination, a position of a piece of the equipment that causes the state of alignment with the eye point and the hand is found, in step S105 illustrated in FIG. 4, a table that corresponds to the piece of the equipment is read from the predetermined storage device.

<Variation 5>

Although for example, the embodiment describes a case where the equipment control device 100, the sensing device 200, the operation device 300, and the equipment 400 are included in a mobile unit, such as an automobile, all or part of the equipment control device 100, the sensing device 200, the operation device 300, and the equipment 400 may be included in somewhere other than in the mobile unit.

The variations of the present disclosure are described above.

Figure 5:
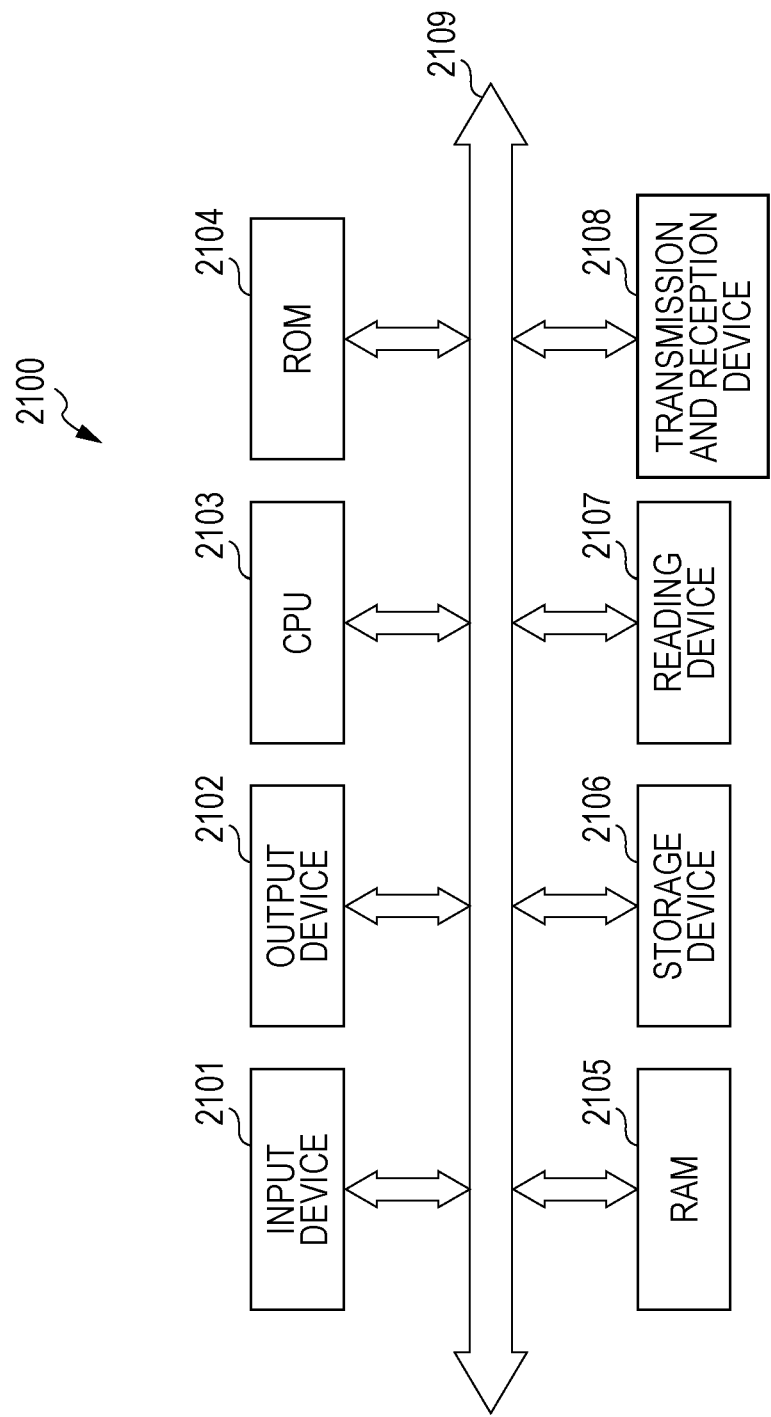
FIG. 5 illustrates a hardware configuration of a computer that implements respective functions of constituents using a program.

FIG. 5 illustrates a hardware configuration of a computer that implements the respective functions of the constituents according to each of the above-described embodiment and variations thereof using a program.

As illustrated in FIG. 5, a computer 2100 includes an input device 2101, such as an input button or a touch pad, an output device 2102, such as a display or a speaker, a central processing unit (CPU) 2103, read-only memory (ROM) 2104, and random access memory (RAM) 2105. The computer 2100 further includes a storage device 2106, such as a hard disk drive (HDD) or a solid state drive (SSD), and a reading device 2107, which reads information from a recording medium, such as digital versatile disk read-only memory (DVD-ROM) or Universal Serial Bus (USB) memory, and a transmission and reception device 2108, which performs communication via a network. The above-described constituents are coupled to one another via a bus 2109.

The reading device 2107 reads a program for implementing the respective functions of the above-described constituents from a recording medium in which the program is recorded and causes the read program to be stored in the storage device 2106. For another example, the transmission and reception device 2108 performs communication with a server apparatus coupled to the network to download the program for implementing the respective functions of the above-described constituents from the server apparatus, and causes the downloaded program to be stored in the storage device 2106.

After that, the CPU 2103 copies the program stored in the storage device 2106 onto the RAM 2105 and reads commands included in the program sequentially from the RAM 2105 to execute the commands, and accordingly, the respective functions of the above-described constituents are implemented. When the program is executed, the information obtained through each process described in each of the embodiment and the variations thereof is stored in the RAM 2105 or the storage device 2106 to be utilized as suitable.

The equipment control device, the equipment control method, the equipment control program, and the recording medium according to the present disclosure are useful for controlling equipment.

What is claimed is:

1. An equipment control device comprising:
a memory that stores instructions; and
a processor that, when executing the instructions stored in the memory, performs operations comprising:
receiving, from a sensor mounted in a vehicle, sensing result information including a position, a shape, and a movement of a predetermined object and including a position of an eye point of a person;

determining whether the eye point, an equipment mounted at a predetermined position on the vehicle, and the predetermined object are aligned, based on the sensing result;

determining whether the object is in a predetermined shape based on the sensing result, the predetermined shape being associated with the equipment in advance;

generating command information, in response to a determination that the eye point, the equipment and the object are aligned and that the predetermined object is in the predetermined shape, the command information causing the equipment to operate in accordance with the movement of the object in the predetermined shape; and outputting the command information to an equipment operating device that operates the equipment based on the command information such that the equipment operates in accordance with the movement of the object in the predetermined shape.

2. The equipment control device according to claim 1, wherein the processor outputs the command information in accordance with the movement of the object, to the equipment operating device, when, in accordance with the sensing result information, the controller determines that the object and the equipment are substantially aligned in a direction of a line of sight of the person and that the object is in the predetermined shape.

3. The equipment control device according to claim 1, wherein the processor determines the command information causing the equipment operating device to operate based on a table, in which the movement of the object and an operation of the equipment correspond to each other and with the movement of the object indicated by the sensing result information.

4. An equipment control method of controlling an equipment mounted in a vehicle, the method comprising:

receiving, by a processor mounted in the vehicle, from a sensor mounted in the vehicle, sensing result information that includes a position, a shape, and a movement of a predetermined object and includes a position of an eye point of a person;

determining whether the eye point, an equipment mounted at a predetermined position on the vehicle, and the predetermined object are aligned, based on the sensing result;

determining whether the object is in a predetermined shaped based on the sensing result, the predetermined shape being associated with the equipment in advance;

generating command information, in response to a determination that the eye point, the equipment and the object are aligned and that the predetermined object is in the predetermined shape, the command information causing the equipment to operate in accordance with the movement of the object in the predetermined shape; and outputting the command information to an equipment operating device that operates the equipment based on the command information such that the equipment operates in accordance with the movement of the object in the predetermined shape.

5. A computer-readable non-transitory recording medium in which an equipment control program executed in an equipment control device that controls an equipment is recorded, the equipment control program causing a computer of the equipment control device to execute a process comprising:

receiving, from a sensor mounted in a vehicle, sensing result information that includes a position, a shape, and a movement of a predetermined object and includes a position of an eye point of a person;

determining whether the eye point, an equipment mounted at a predetermined position on the vehicle, and the predetermined object are aligned, based on the sensing result;

determining whether the object is in a predetermined shape based on the sensing result, the predetermined shape being associated with the equipment in advance;

generating command information, in response to a determination that the eye point, the equipment and the object are aligned and that the predetermined object is in the predetermined shape, the command information causing the equipment to operate in accordance with the movement of the object in the predetermined shape; and outputting the command information to an equipment operating device that operates the equipment based on the command information such that the equipment operates in accordance with the movement of the object in the predetermined shape.

* * * * *